US011990022B2

(12) United States Patent
Barson et al.

(10) Patent No.: US 11,990,022 B2
(45) Date of Patent: May 21, 2024

(54) SELF-TESTING DUCT ENVIRONMENT DETECTOR

(71) Applicant: Honeywell International Inc., Charlotte, NC (US)

(72) Inventors: Michael Barson, Nuneaton (GB); Scott Lang, Geneva, IL (US); Christopher Dearden, Melton Mowbray (GB); Benjamin H. Wolf, Leicester (GB)

(73) Assignee: Honeywell International Inc., Charlotte, NC (US)

( * ) Notice: Subject to any disclaimer, the term of this patent is extended or adjusted under 35 U.S.C. 154(b) by 353 days.

(21) Appl. No.: 17/084,735

(22) Filed: Oct. 30, 2020

(65) Prior Publication Data

US 2022/0139207 A1 May 5, 2022

(51) Int. Cl.

| | |
|---|---|
| ***G08B 17/107*** | (2006.01) |
| ***F24F 11/30*** | (2018.01) |
| ***G08B 17/113*** | (2006.01) |
| ***G08B 17/117*** | (2006.01) |
| ***G08B 29/14*** | (2006.01) |

(52) U.S. Cl.

CPC ......... *G08B 29/145* (2013.01); *G08B 17/107* (2013.01); *G08B 17/113* (2013.01); *G08B 17/117* (2013.01); *F24F 11/30* (2018.01)

(58) Field of Classification Search

CPC .. G08B 29/145; G08B 17/107; G08B 17/113; G08B 17/117; F24F 11/30

See application file for complete search history.

(56) References Cited

U.S. PATENT DOCUMENTS

| | | | | |
|---|---|---|---|---|
| 5,670,946 | A | 9/1997 | Ellwood et al. | |
| 5,818,326 | A * | 10/1998 | Winterble | G08B 17/10 340/522 |
| 7,508,313 | B2 | 3/2009 | Cole | |
| 7,934,411 | B2 | 5/2011 | Koch | |
| 8,646,305 | B2 | 2/2014 | Townsend et al. | |

(Continued)

FOREIGN PATENT DOCUMENTS

| | | |
|---|---|---|
| CN | 104049628 A | 9/2014 |
| CN | 106461497 A | 2/2017 |

(Continued)

OTHER PUBLICATIONS

Extended European Search Report for related European Application No. 21205278.1, dated Mar. 4, 2022 (8 pgs).

*Primary Examiner* — Natalie Huls
*Assistant Examiner* — Sharad Timilsina
(74) *Attorney, Agent, or Firm* — Brooks, Cameron & Huebsch, PLLC

(57) ABSTRACT

Devices, methods, and systems of a self-testing duct environment detector are described herein. One self-testing duct environment detector system includes a first portion to be mounted outside of a duct, the first portion having a detector housing with a space therein, the space having a detector with a sensing chamber and a self-testing sensing apparatus therein, wherein the self-testing sensing apparatus determines whether airflow through the detector housing is above a threshold and a second portion and third portion each configured to extend into the duct, wherein the second portion has at least one inlet aperture formed therein and wherein the third portion has at least on outlet aperture therein.

20 Claims, 6 Drawing Sheets

(56) References Cited

U.S. PATENT DOCUMENTS

| | | | | |
|---|---|---|---|---|
| 9,459,208 | B2 | 10/2016 | Orsini et al. | |
| 9,541,467 | B2 | 1/2017 | McCollom et al. | |
| 9,959,748 | B2 | 5/2018 | Moffa | |
| 10,545,041 | B2 | 1/2020 | Ajay et al. | |
| 11,385,138 | B2 | 7/2022 | Grabau et al. | |
| 2004/0035179 | A1 | 2/2004 | Koch | |
| 2005/0030172 | A1 * | 2/2005 | Right | G08B 17/10 340/521 |
| 2005/0204799 | A1 * | 9/2005 | Koch | G08B 29/145 73/1.06 |
| 2013/0008787 | A1 * | 1/2013 | Mammoto | G08B 17/00 204/415 |
| 2013/0016355 | A1 * | 1/2013 | Landry | G01N 21/534 356/442 |
| 2015/0096351 | A1 * | 4/2015 | Orsini | G01N 21/53 73/28.01 |
| 2017/0287318 | A1 * | 10/2017 | Moffa | G08B 29/043 |

FOREIGN PATENT DOCUMENTS

| | | | | |
|---|---|---|---|---|
| CN | 206648925 | U | 11/2017 | |
| EP | 1325299 | B1 | 12/2010 | |
| GB | 2543065 | A * | 4/2017 | B05B 17/0646 |

* cited by examiner

SELF-TESTING DUCT ENVIRONMENT DETECTOR

TECHNICAL FIELD

The present disclosure relates generally to devices, methods, and systems for self-testing duct environment detectors, such as to detect environmental elements such as smoke, carbon dioxide, or carbon monoxide.

BACKGROUND

Currently, the way of testing duct smoke detectors commonly involves a maintenance engineer physically removing the duct housing cover and measuring the differential pressure between the inlet and outlet of the detector with a pressure measuring apparatus positioned by the engineer. Furthermore, the maintenance engineer will also carry out a functional test on the smoke detector, contained in the detector housing, by typically spraying synthetic smoke directly into the smoke sensor and thereby triggering a smoke alarm condition.

This is a very labor intensive process, as often ducts are found in difficult to access areas of the building and, as such, can often go unchecked for years. Also, if the detector housing cover is removed it creates the possibility of either damaging the seal that seals the detector housing or that the maintenance engineer may not replace the cover correctly in order to create the required firm seal. These issues could lead to an air leakage outside of the detector system and there would be no way of being able to monitor this failure using existing maintenance processes. One result of this failure is that smoke could enter the detector housing and exit the housing through an incorrectly positioned seal, instead of going through the smoke detector, therefore, the ability for the duct detector to detect smoke could be compromised.

DETAILED DESCRIPTION

Figure 1:
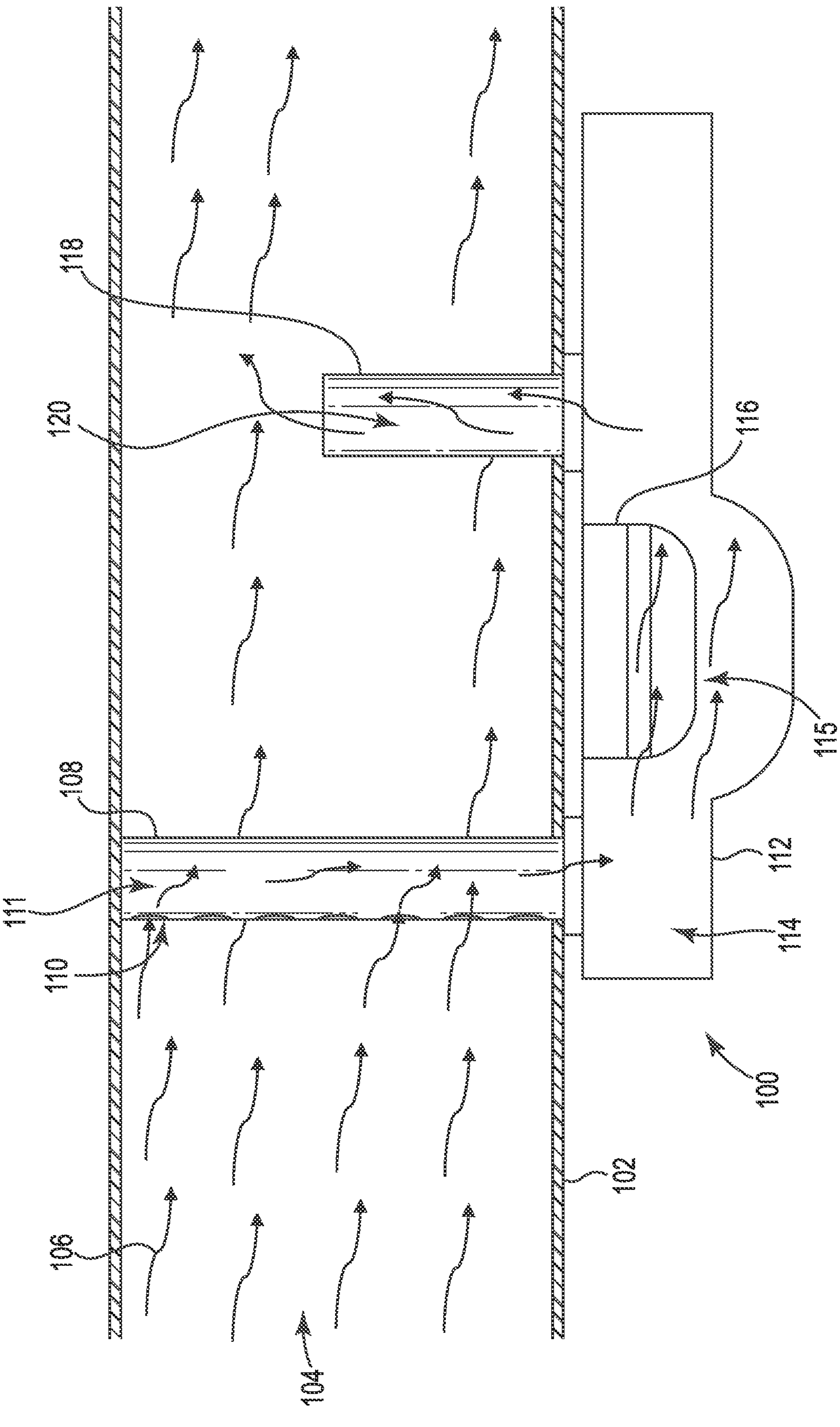
FIG. 1 is an illustration of a self-testing duct environment detector mounted in a duct system to be inspected in accordance with an embodiment of the present disclosure.

The present disclosure relates generally to devices, methods, and systems for self-testing duct environment detectors. Specifically, the present disclosure relates to environment detectors with a self-testing function that are mounted to a duct of a building.

Several self-testing mechanisms are utilized in the various embodiments discussed herein, such as smoke testing, aerosol testing, and thermistor testing, among others. One self-testing duct environment detector system includes a first portion to be mounted outside of a duct, the first portion having a detector housing with a space therein, the space having a detector with a sensing chamber and a self-testing sensing apparatus therein, wherein the self-testing sensing apparatus determines whether a rate of airflow through the detector housing or sensing chamber is above a threshold rate and a second portion and third portion each configured to extend into the duct, wherein the second portion has at least one inlet aperture formed therein and wherein the third portion has at least on outlet aperture therein.

A self-testing duct environment detector uses a housing containing an environmental element detector and connects, through a venturi pipe system tube, into a duct. A duct, is an elongate conduit having a space therein and is typically used in heating and ventilation systems to move air from one place to another through a building to heat, cool, or circulate air through spaces within the building. For example, ducts move air from a conditioning source, such as a boiler, furnace, or air cooling unit to one or more rooms within a building, among other duct uses.

In a system using a duct environment detector, the airflow moving through the duct and passing around the venturi tube causes a differential pressure and the air enters an upstream tube, going through the detector housing, where it flows into the environment detector and out of the detector housing, through a downstream outlet tube and back into the duct. For example, in use with a smoke detector, if smoke enters the duct, then this process ensures that the smoke will enter the smoke detector where it can be detected and raise an alarm or generate a control signal.

Another self-testing system includes an airflow monitor that, for example, uses a self-heating thermistor. The self-heating thermistor can be placed in the duct detector or detector housing and can periodically test the continued airflow in the detector housing, by heating up the thermistor measuring to what temperature it can heat up to, and then the rate at which the heat signal cools down over time. These and other embodiments are discussed in more detail below.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing.

As used herein, "a", "an", or "a number of" something can refer to one or more such things, while "a plurality of" something can refer to more than one such things. For example, "a number of components" can refer to one or more components, while “a plurality of components” can refer to more than one component.

FIG. 1 is an illustration of a self-testing duct environment detector mounted in a duct system to be inspected in accordance with an embodiment of the present disclosure. As illustrated in FIG. 1, the environment detector system 100 is mounted with a portion outside of a duct 102 and two portions (108 and 118) extending into the duct 102. The portion outside the duct includes a detector housing 112 with a space 114 having a detector 115 with a sensing chamber 116 therein.

The portions that extend into the duct are a first tube 108 and a second tube 118. Both tubes allow communication of air 106 between the space 104 within the duct and the space within the detector housing 112 through the space within the respective tube.

For example, the first tube 108 has a number of apertures 110 thereon that allow air to pass from the interior space 104 of the duct 102 into the interior space 111 of the tube 108. This air is merely a sample, as other portions of the air continue past the tube 108 and continue down the interior space 104 of the duct 102.

This sampled air within the tube 108 travels via the interior space 111 into the interior 114 of the detector housing 112. Some or all of the air then passes through the sensing chamber 116 of the detector 115 and then out of the detector housing 112 and back into the interior of the duct 104 via the interior space 120 of the tube 118, which is the second portion of the system that extends into the duct 102.

The movement of air, and thereby, the accomplishment of the self-testing of the system 100 relies on the airflow through the duct and a differential pressure between the inlet (holes 110) of the venturi tube 108 and the outlet of the exit tube 118 to draw air from the interior space 104 of the duct into the venturi tube 108 and thereby into the detector housing 112 and past a sensor within the detector 115.

This same process is used to detect adverse environmental conditions, wherein air carrying smoke particles or concentrated carbon monoxide, carbon dioxide, or other harmful environmental elements that can be sensed, may be present in the air within the interior 104 of duct 102. However, if the system is compromised, the use of such a system may be ineffective. Two such examples are illustrated in FIGS. 2 and 3.

Figure 2:
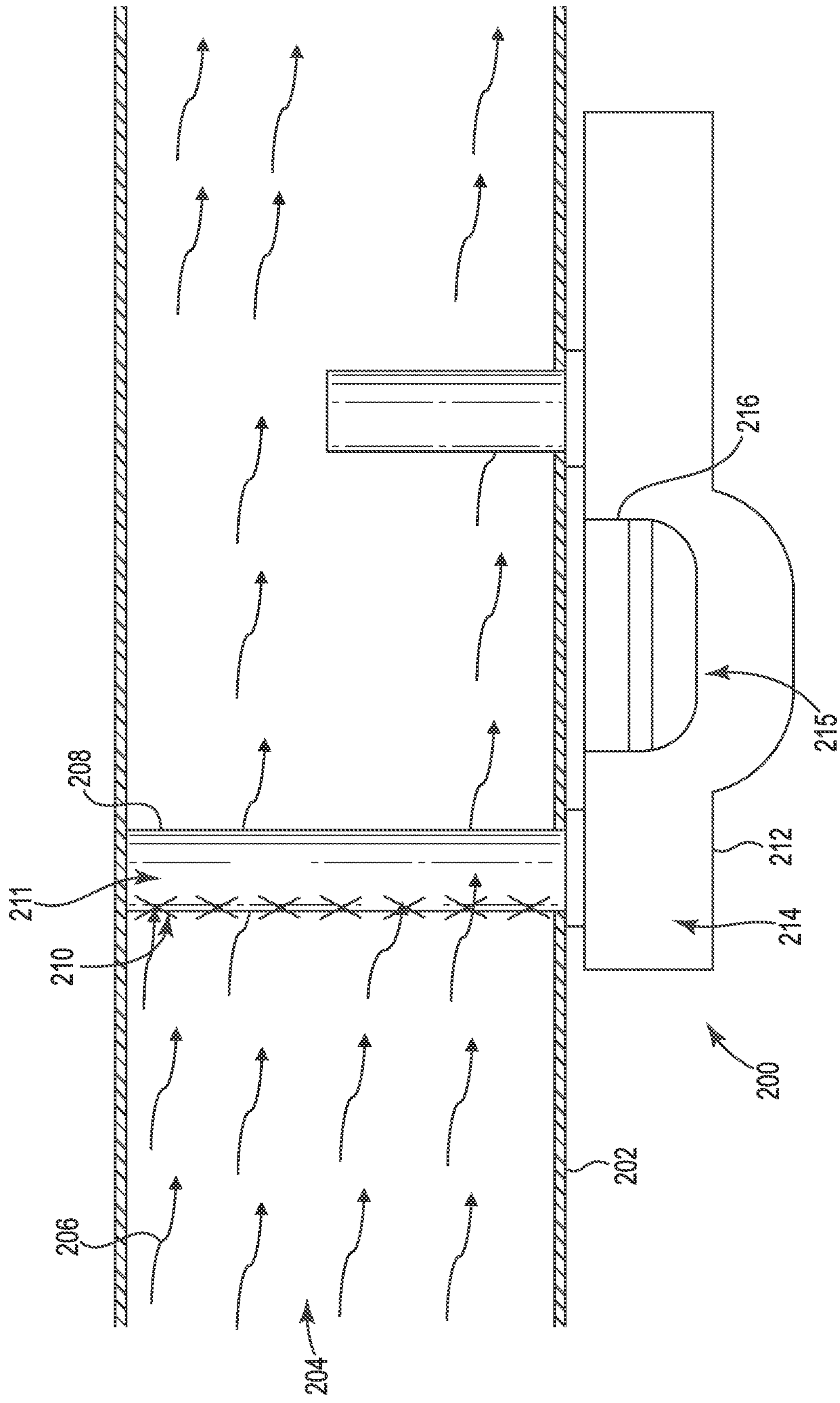
FIG. 2 is an illustration of a self-testing duct environment detector mounted in a duct system to be inspected with blocked inlet apertures in accordance with an embodiment of the present disclosure.
Figure 3:
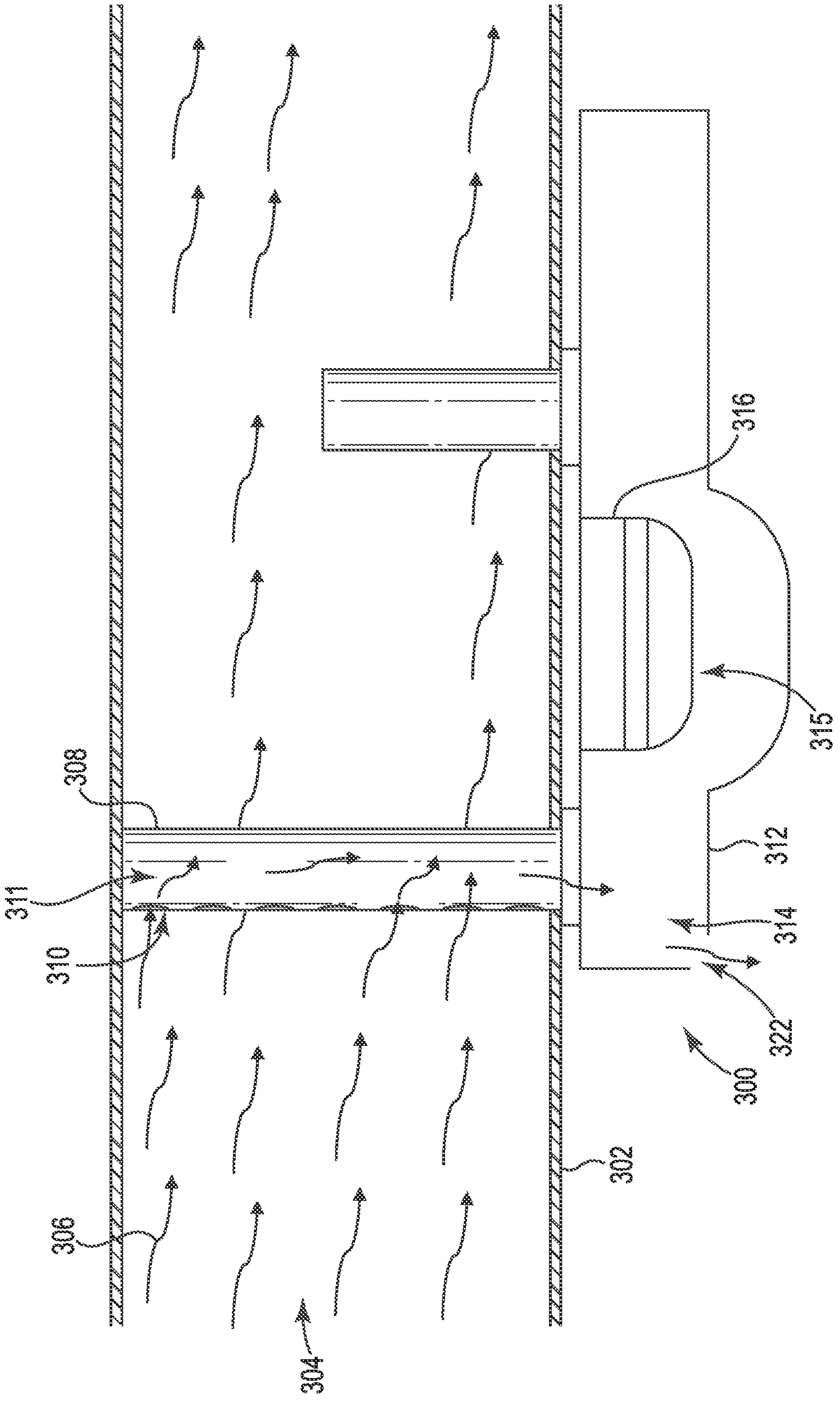
FIG. 3 is an illustration of a self-testing duct environment detector mounted in a duct system to be inspected having a leak in the environment detector housing surface in accordance with an embodiment of the present disclosure.

FIG. 2 is an illustration of a self-testing duct environment detector mounted in a duct system to be inspected with blocked inlet apertures in accordance with an embodiment of the present disclosure. In the example of FIG. 2, over time, particulate (e.g., dust, debris) has built up on the side of the tube 208 such that little to no air 206 passes from the interior space 204 of the duct 202 through the inlet apertures 210 (as they are blocked by the particulate) into the interior space 211 of the tube 208. This blockage of the inlet apertures (shown on the side surface of the tube in this example) is represented by the X’s in FIG. 2.

In turn, there is little to no airflow from the tube 208 to the interior space 214 of the detector housing 212. Consequently, there is not enough airflow through the sensing chamber 216 of the detector 215 to get accurate readings to determine if a harmful condition exists based on concentration levels of an environmental element in the air.

Even if not blocked to the extent shown, a diminishment of the volume of air through the system 200 can reduce the effectiveness of the system. A similar issue may arise where a leak is present in the system, as is illustrated in FIG. 3.

FIG. 3 is an illustration of a self-testing duct environment detector mounted in a duct system to be inspected having a leak in the environment detector housing surface in accordance with an embodiment of the present disclosure. In the example of FIG. 3, a leak has been created in the system 300. This can happen, for example, due to tampering with the system, improper handling or sealing of the detector housing 312 by a technician, or other potential causes. Damage to the tube 308 could also create a similar issue.

In a situation such as that shown in FIG. 3, air 306 may continue to flow through apertures 310 from the interior space 304 of the duct 302 into the interior space 311 of the tube 308.

Air continues to progress into the interior space 314 of the detector housing 312. However, rather than moving into the detector 315, the airflow exits the detector housing 312 through the hole 322. Consequently, as in the previous example, there is not enough airflow through the sensing chamber 316 of the detector 315 to get accurate readings to determine if a harmful condition exists based on concentration levels of an environmental element in the air.

The embodiments of the present disclosure include mechanisms and processes to detect issues such as those illustrated in FIGS. 2 and 3 and such mechanisms and processes are discussed in more detail below.

Figure 4:
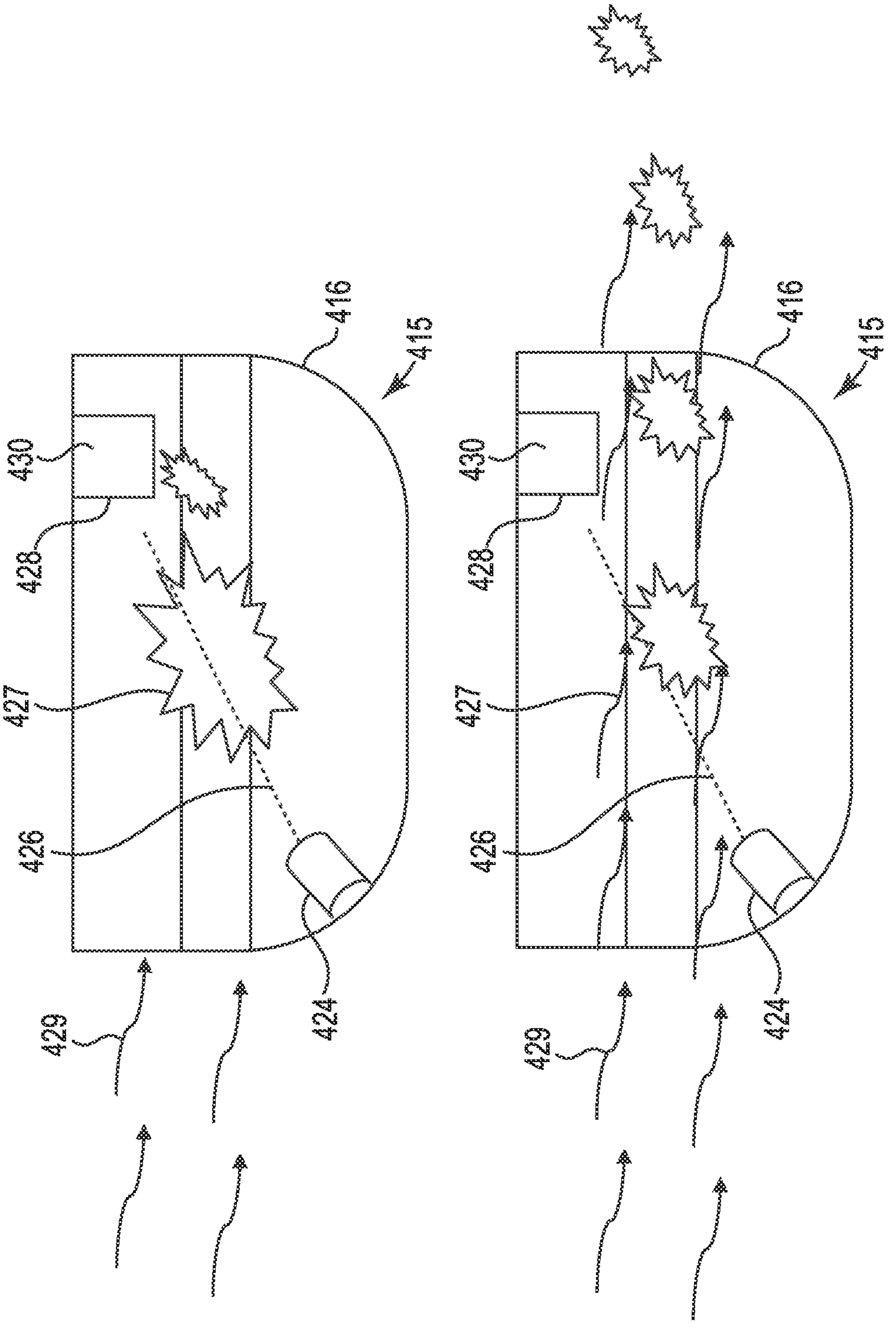
FIG. 4 is an illustration of a self-testing duct environment detector with an particulate generator for use in accordance with an embodiment of the present disclosure.

FIG. 4 is an illustration of a self-testing duct environment detector with a particulate generator for use in accordance with an embodiment of the present disclosure. In the top illustration, a test is being performed where airflow 429 below a threshold for effective sensing is entering the detector 415. This can be occurring where issues that have arisen in FIGS. 2 and 3 have occurred.

In this illustration, the sensing chamber 416 of the detector 415 is equipped with a particulate generator 430 (e.g., aerosol/smoke) a light source (e.g., light emitting diode (LED)), and a sensor 428. As the test is implemented, a light beam 426 is directed by light source 424 at a sensor 428. The sensor measures the amount of light received by the sensor.

In such a system, the particulate generator generates particulate 427 within the interior of the sensing chamber 416. Since there is little airflow through the chamber 416 in this example, the density of the particulate continues to increase until the generator stops generating particulate.

Consequently, when the sensor 428 measures the amount of light received from the light beam 426, the amount is more than if there were no particulate 427 in the chamber due to the particles scattering light to the sensor.

In the bottom illustration, a test is being performed where airflow 429 above a threshold for effective sensing is entering the detector 415. This can be occurring during normal operation of the system or when issues that have arisen in FIGS. 2 and 3 have not occurred.

In such an example, the particulate generator generates particulate 427 within the interior of the sensing chamber 416. However, in this example, there is sufficient airflow passing through the chamber 416 that the density of the particulate is dispersed as it is carried away by the airflow through the chamber, as shown in the bottom figure.

Consequently, when the sensor 428 measures the amount of light received from the light beam 426, it can be quantified as an obscuration level, and the amount may be more than if there were no particulate 427 in the chamber, but less than if there were no airflow through the chamber.

This obscuration level can, for example be a quantified measurement based on the data collected from the sensor 428. Several of these quantified data points can be taken over a period of time to calculate an obscuration rate over time. These types of data can be desirable for calculating a flow rate of the airflow through the detector 415 as well as the differential pressure of the detector system.

This information can be used to determine the condition of the detector system (e.g., operable or in need of maintenance). For example, the data or calculated values created from the sensor data can be compared with values stored in memory (e.g., threshold values) to determine whether the system is operable or need of service.

For instance, a sensed flow rate of air through a detector housing can be compared with a threshold value to determine whether the sensed value is above a threshold. In this example, the threshold can be a limit, determined through testing or prior data collection or can be estimated, at which a value on one side of the threshold (e.g., above or equal to) means that the airflow is sufficient for normal operation of the detector and a value on the other side of the threshold (e.g., below) indicates that the airflow may be insufficient.

Figure 5:
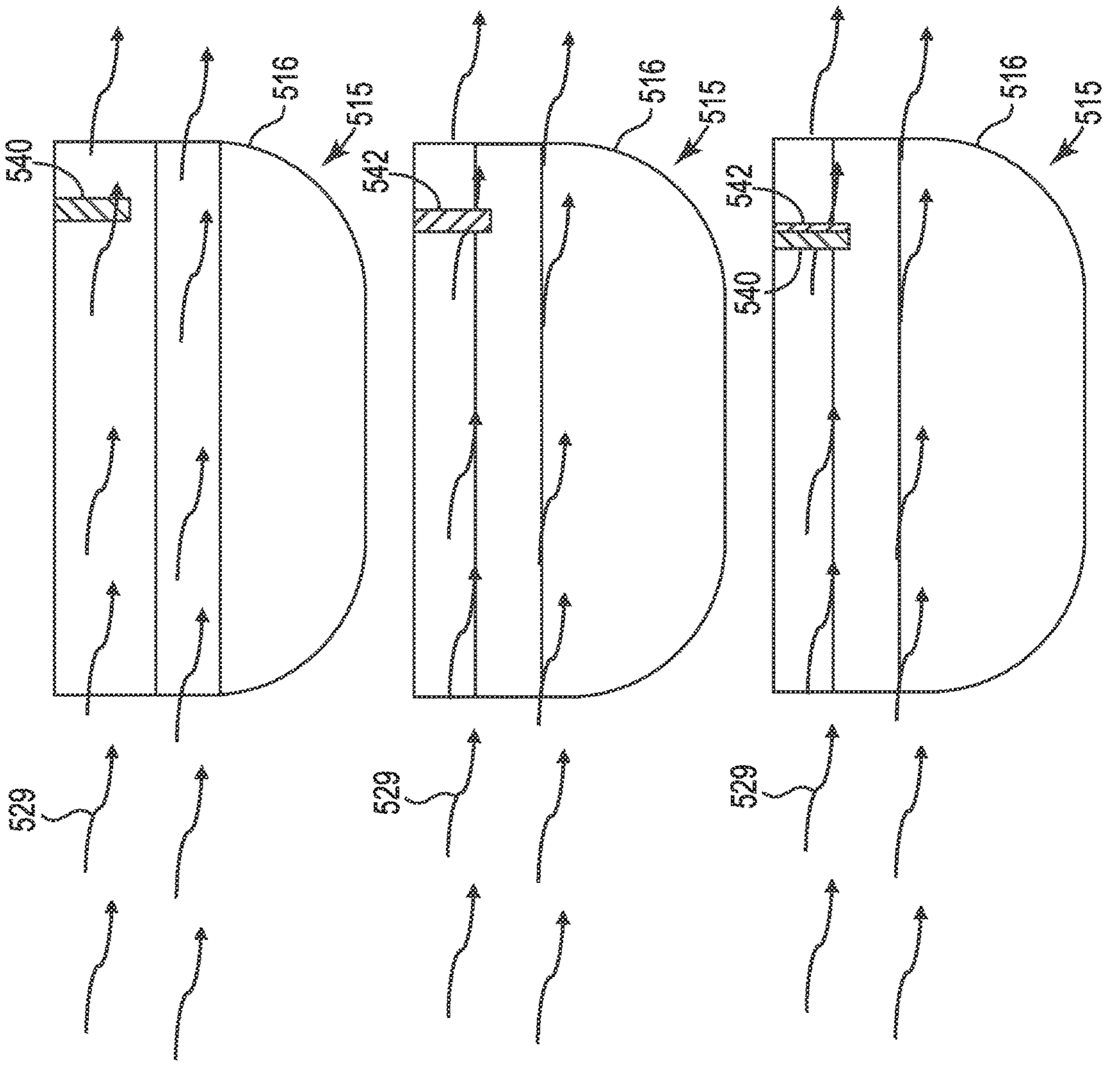
FIG. 5 is an illustration of a self-testing duct environment detector with a self-heating thermistor for use in accordance with an embodiment of the present disclosure.

FIG. 5 is an illustration of a self-testing duct environment detector with a self-heating thermistor for use in accordance with an embodiment of the present disclosure. In this embodiment, a self-heating thermistor 540 is positioned in the sensing chamber 516 of detector 515. As the airflow passes through the chamber, it will cool the heated thermistor. For example, in the top figure, the thermistor 540 is cold. In the middle figure, the thermistor is heated to a predetermined temperature 542.

The general change in temperature of the thermistor at different times can be sensed by the thermistor and this data can be used to determine whether there is sufficient airflow flowing through the chamber 516. Further a rate of temperature change over time can be compared to rate of change values stored in memory to determine whether the rate of temperature change represents an airflow that is sufficient for operation of the self-testing duct environment detector system.

Although two sensing mechanisms and processes are discussed above, any airflow measurement technique could be utilized. For example, an ultrasonic apparatus and technique, an electrochemical sensing apparatus and technique could also be utilized or a technique wherein airflow could be measured by using the dilution of gas from a gas generator, among others.

For example, apparatus and techniques that prove that airflow is passing through the detector (e.g., a measured quantity in feet per minute), that there is a threshold level of differential pressure, or that there is a measured threshold dilution density reduction rate (e.g., rate of change of the density of particulate sensed by the sensor in the sensing chamber over time) are all acceptable apparatus and techniques.

One or more algorithms stored in memory and used by executable instructions executed by a processor within the environment detector can be used to take the sensed data and determine whether there is sufficient airflow within the duct (e.g., above a threshold value stored in memory) and determine if the test has passed or failed. This information can, then, be reported back through a system control panel (e.g., fire alarm system control panel at the building) and can alert the maintenance technician if the airflow is in or out of a threshold range and whether the sensor has passed or failed the functional environmental self-test indicating that the detector will detect properly during normal operation. For example, an alert message can be sent to a monitoring device, if the rate of temperature change is below the threshold value.

In some embodiments, a self-test can be carried out in the background during its normal operation period by the airflow monitor and can initiate a fault signal back to the fire alarm control panel if it has failed to detect airflow in the duct housing. Such a process could form a more regular monitoring of a failure mode outside of prescribed interval system testing time periods prescribed, for example, by a local code of practice for fire system maintenance.

In various embodiments, self-testing can also be accomplished without setting the fire or gas safety system for the whole building into test mode. Putting the entire system into test mode increases the risk of the building experiencing a hazardous event as the system is not actively monitoring the building when in test mode.

Alternative ways of having of proving airflow, could be achieved as follows. In one alternative manner airflow can be monitored without the need to carry out a functional test of the system. This could be achieved through using the aerosol particulate generation at density levels insufficient to cause a fire response from the detector 515, but, sufficient in volume to monitor the rate of decay of the density of the particulate and, therefore, proving airflow is above a threshold quantity.

In another alternative manner, sensors could be used within the duct housing to measure differential pressure on the inlet and outlet tubes proving airflow. For example, a first pressure can be measured on a first end of the space within the detector housing (e.g., near tube 108 in FIG. 1) and a second pressure can be measured on a second end of the space within the detector housing (e.g., near tube 118 in FIG. 1). The differential pressure could then be determined by comparing the first measured pressure and the second measured pressure (e.g., subtracting one pressure value from the other). In another alternative manner, an airflow monitoring sensor could be placed within the duct housing outside of the detector 515.

Figure 6:
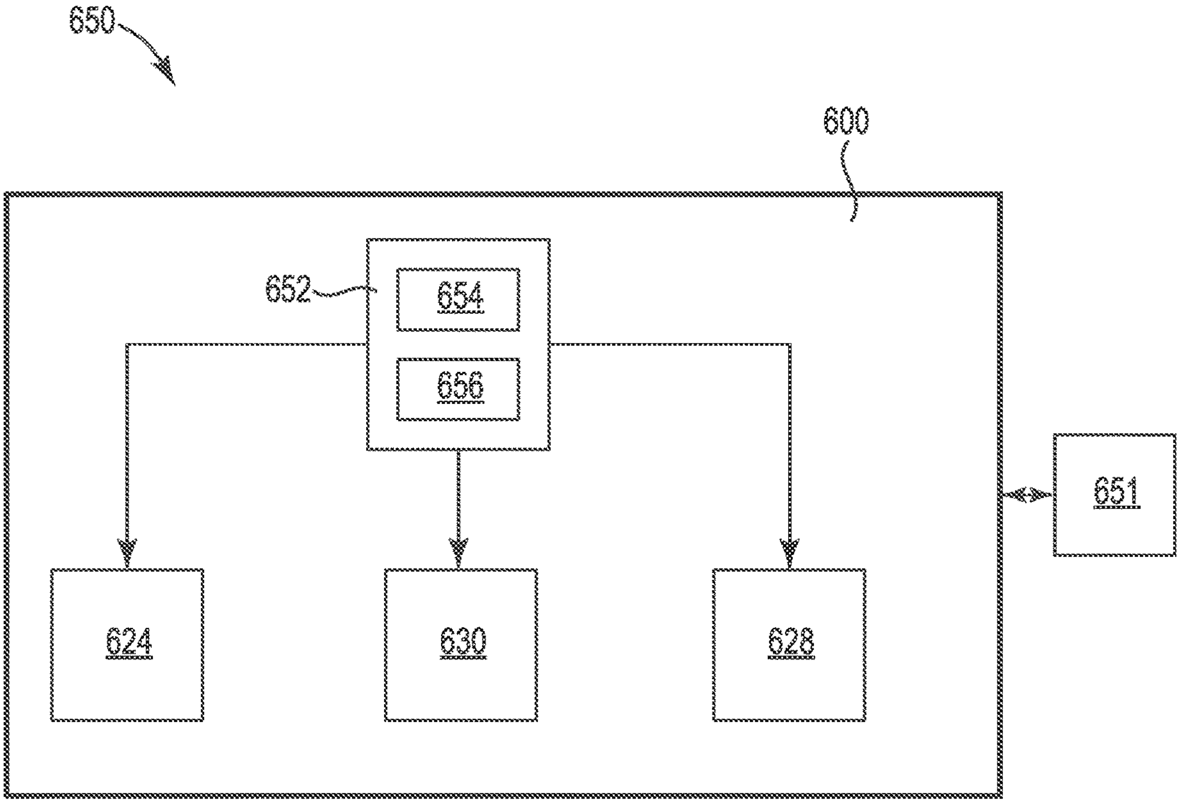
FIG. 6 is a block diagram of a self-test function of a duct environment detector in accordance with an embodiment of the present disclosure.

FIG. 6 is a block diagram of a self-test function of a duct environment detector in accordance with an embodiment of the present disclosure. The block diagram of the self-test function 650 includes an environment detector system 600 and a monitoring device 651. The environment detector system 600 includes a controller (e.g., microcontroller) 652, a particulate/gas generator 630, and a sensor 628.

Sensor 628 can be a smoke (e.g., particulate) sensor, a carbon monoxide (CO) sensor, a carbon dioxide ($CO_2$) sensor, or a combination of two or more thereof. For example, sensor 628 can be an optical sensor such as optical scatter chamber, a gas sensor, an ionization sensor, an electrochemical sensor, or an ultrasonic sensor, among other types of sensors.

The monitoring device 651 can be a control panel, a fire detection control system, and/or a cloud computing device of a fire alarm system. The monitoring device 651 can be configured to send commands to and/or receive test results from an environment detector system 600 via a wired or wireless network.

The network can be a network relationship through which monitoring device 651 can communicate with the environment detector system 600. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from, and transmit information to, monitoring device 651 and the environment detector system 600 via a wired or wireless network.

As used herein, a "network" can provide a communication system that directly or indirectly links two or more computers and/or peripheral devices and allows a monitoring device to access data and/or resources on an environment detector system 600 and vice versa. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

The microcontroller 652 can include a memory 654 and a processor 656. Memory 654 can be any type of storage medium that can be accessed by processor 656 to perform various examples of the present disclosure.

For example, memory 654 can be a non-transitory computer readable medium having computer readable instructions (e.g., computer program instructions) stored thereon that are executable by processor 656 to test an environment detector system 600 in accordance with the present disclosure. For instance, processor 656 can execute the executable instructions stored in memory 654 to generate a particular particulate density level, measure the generated particulate density level, determine an airflow rate from an external environment through the sensor 628, and transmit the determined airflow rate to the monitoring device 651. In some examples, memory 654 can store the particulate density level (or CO or CO2 level) sufficient to trigger a response to an environmental threat from a properly operating environment detector system, the particulate density level sufficient to test a fault condition without triggering an environmental response, the threshold airflow rate to verify proper airflow through the sensor 628, and/or the particular period of time that has passed since previously conducting a self-test function (e.g., generating a particular particulate density level and measuring the generated particulate density level). Although discusses in this section as regarding particulate sensing, it should be understood that CO and/or CO2 sensing and levels can be additionally or alternatively handled as discussed with respect to particulate sensing and levels.

As an additional example, processor 656 can execute the executable instructions stored in memory 654 to generate a particulate density level, measure a rate at which the particulate density level decreases after the particulate density level has been generated, compare the measured rate at which the particulate density level decreases with a threshold rate, and determine whether the environment detector system 600 is functioning properly (e.g., requires maintenance) based on the comparison of the measured rate and the threshold rate. In some examples, memory 654 can store the threshold rate and/or the measured rate.

The microcontroller 652 can execute the self-test function 650 of the environment detector system 600 responsive to a particular period of time passing since previously conducting a self-test function and/or responsive to receiving a command from the monitoring device 651 to initiate a self-test. For example, the microcontroller 652 can initiate generation of particulate via the particulate generator 630 to begin the self-testing process. In some embodiments, the generator 630 can generate a gas (e.g., CO, CO2) for self-testing a gas detector wherein the detector tests for gas density within the sensing chamber and can determine a rate of change of gas dilution over time, among other data/calculations that can be made and utilized in embodiments of the present disclosure.

As shown in FIG. 6, the environment detector system 600 can include a transmitter light source 624 and a receiver photodiode 628 to measure the particulate density level. The monitoring device 651 can, for example, send a command to the light source to produce a light beam to measure the particulate density level.

Once the particulate density level is measured and/or the airflow rate is determined, the environment detector system 600 can store the test result (e.g., fire response, particulate density level, rate at which the particulate density level decreases after the particulate density level has been generated, and/or airflow rate) in memory 654 and/or send the test result to the monitoring device 651. Further, the measured rate at which the particulate density level decreases can be stored in memory 654 as a threshold rate if, for example, the measured rate is the first (e.g., initial) measured rate at which the particulate density level decreases in the environment detector system 600. If the environment detector system 600 already has a threshold rate, then the measured rate can be stored in memory 654 as a subsequently measured rate at which the particulate density level decreases.

In some examples, the environment detector system 600 (e.g., controller 652) can determine whether the environment detector system 600 is functioning properly based on the test result and/or the monitoring device 651 can determine whether the environment detector system 600 is functioning properly based on the test result. For example, the monitoring device 651 can determine the environment detector system 600 is functioning properly responsive to the triggering of an environmental threat response and/or the airflow rate exceeding a threshold airflow rate.

In some examples, the environment detector system 600 (e.g., controller 652) and/or monitoring device 651 can determine whether the environment detector system 600 is functioning properly (e.g., requires maintenance) by comparing the subsequently measured rate at which the particulate density level decreases with the threshold rate. For example, the environment detector system 600 may require maintenance when the difference between the measured rate and the threshold rate is greater than a threshold value. The threshold value can be set by a manufacturer, according to regulations, and/or set based on the threshold rate, for example.

In utilizing the embodiments of the present disclosure, a duct detection device can be self-tested thereby reducing labor spent by engineers physically checking the devices. This can result in substantial monetary and technician hour savings.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A self-testing duct environment detector system, comprising:

a first portion to be mounted outside of a duct, the first portion having a detector housing with a space therein, the space having a detector with a sensing chamber and a self-testing sensing apparatus therein, wherein the self-testing sensing apparatus determines whether a rate of airflow through the sensing chamber is above a threshold rate; and a second portion and third portion each configured to extend into the duct, wherein the second portion has at least one inlet aperture formed therein and wherein the third portion has at least one outlet aperture therein; and wherein the self-testing sensing apparatus includes a particulate generator that generates self-test particulate into the sensing chamber and determines an obscuration rate of the self-test particulate over a period of time and compares the rate with at least one threshold rate to determine if airflow is adequate.

2. The self-testing duct environment detector system of claim 1, wherein second portion is a tube having an interior space therein and is connected to the first portion such that air can pass from the interior space of the second portion into the space within the detector housing.

3. The self-testing duct environment detector system of claim 1, wherein the second portion has a plurality of inlet apertures formed in a side surface thereof that allow air to pass from an interior space within the duct into the second portion.

4. The self-testing duct environment detector system of claim 1, wherein third portion is a tube having an interior space and is connected to the first portion such that air can pass from the space within the detector housing into the interior space of the third portion.

5. The self-testing duct environment detector system of claim 1, wherein the self-testing sensing apparatus includes a particulate generator that generates particulate into the sensing chamber.

6. The self-testing duct environment detector system of claim 1, wherein the detector of the self-testing sensing apparatus includes a light source and a sensor that detects light from the light source.

7. The self-testing duct environment detector system of claim 1, wherein the detector of the self-testing sensing apparatus includes a thermistor.

8. A method for self-testing duct environment detector system, comprising:

initiating a self-test protocol for a self-testing duct environment detector system to determine whether a flow rate of air through a detector housing is above a threshold and wherein, the self-testing duct environment detector system includes:

a first portion to be mounted outside of a duct, the first portion having a detector housing with a space therein, the space having a detector with a sensing chamber and a self-testing sensing apparatus therein; and a second portion and third portion each configured to extend into the duct, wherein the second portion has at least one inlet aperture formed therein and wherein the third portion has at least on outlet aperture therein; and wherein the self-testing sensing apparatus includes a particulate generator that generates self-test particulate into the sensing chamber and determines an obscuration rate of the self-test particulate over a period of time and compares the rate with at least one threshold rate to determine if airflow is adequate.

9. The method of claim 8, wherein the method includes measuring a first pressure on a first end of the space within the detector housing and measuring a second pressure on a second end of the space within the detector housing.

10. The method of claim 9, further including:

determining a pressure difference by comparing the first measured pressure and the second measured pressure.

11. The method of claim 10, further including heating a thermistor to a first temperature sensed at a first time and comparing the first temperature to a second temperature sensed at a second time to determine a rate of temperature change over time.

12. The method of claim 11, further including comparing the determined rate of temperature change over time to a threshold value to determine if the airflow through the detector housing is sufficient for operation of the self-testing duct environment detector system.

13. The method of claim 12, further including sending an alert message to a monitoring device if the rate of temperature change is below the threshold value.

14. The method of claim 10, further including determining a particulate density sensed at a first time and comparing the first particulate density to a second particulate density sensed at a second time to determine a rate of particulate density change over time.

15. The method of claim 14, further including comparing the determined rate of particulate density change over time to a threshold value to determine if the airflow through the detector housing is sufficient for operation of the self-testing duct environment detector system.

16. The method of claim 15, further including sending an alert message to a monitoring device if the rate of particulate density change is below the threshold value.

17. A self-testing duct environment detector system, comprising:

a first portion to be mounted outside of a duct, the first portion having a detector housing with a space therein, the space having a detector with a sensing chamber and a self-testing sensing apparatus therein, wherein the self-testing sensing apparatus determines whether a density of airflow through the detector housing is above a threshold quantity; and a second portion and third portion each configured to extend into the duct, wherein the second portion has at least one inlet aperture formed therein and wherein the third portion has at least one outlet aperture therein; and wherein the self-testing sensing apparatus includes a particulate generator that generates self-test particulate into the sensing chamber and determines an obscuration rate of the self-test particulate over a period of time and compares the rate with at least one threshold rate to determine if airflow is adequate.

18. The self-testing duct environment detector system of claim 17, wherein the self-testing sensing apparatus is selected from the group of apparatus including, a light source and photodiode sensing apparatus, a thermistor sensing apparatus, an ultrasonic sensing apparatus, and an electrochemical sensing apparatus.

19. The self-testing duct environment detector system of claim 17, wherein the self-testing sensing apparatus includes a gas generator that generates a gas into the sensing chamber.

20. The self-testing duct environment detector system of claim 17, wherein the self-testing sensing apparatus includes an aerosol generator that generates an aerosol into the sensing chamber.

* * * * *